(12) United States Patent
Ogasawara et al.

(10) Patent No.: US 7,707,598 B2
(45) Date of Patent: Apr. 27, 2010

(54) DISK-LOADING ROLLER

(75) Inventors: Satoko Ogasawara, Yokohama (JP); Masao Tsukada, Yokohama (JP)

(73) Assignee: Synztec Co., Ltd., Tokyo (JP)

( * ) Notice: Subject to any disclaimer, the term of this patent is extended or adjusted under 35 U.S.C. 154(b) by 604 days.

(21) Appl. No.: 11/706,240

(22) Filed: Feb. 15, 2007

(65) Prior Publication Data
US 2007/0204281 A1    Aug. 30, 2007

(30) Foreign Application Priority Data
Feb. 16, 2006  (JP)  ............................. 2006-039783
Feb. 13, 2007  (JP)  ............................. 2007-031796

(51) Int. Cl.
*G11B 17/04*  (2006.01)
(52) U.S. Cl. ...................................... 720/624
(58) Field of Classification Search ................. 720/624, 720/619, 625, 623, 661, 713, 673, 645
See application file for complete search history.

(56) References Cited

U.S. PATENT DOCUMENTS 5,260,925 A  * 11/1993  Camps et al. ............... 720/624
6,714,507 B2 *  3/2004  Kato ........................... 720/624
2005/0193401 A1 *  9/2005  Lin et al. .................... 720/624

FOREIGN PATENT DOCUMENTS

JP        3627866 B1    12/2004

* cited by examiner

*Primary Examiner*—Allen T Cao
(74) *Attorney, Agent, or Firm*—Sughrue Mion, PLLC

(57) ABSTRACT

An object of the present invention is to provide a disk-loading roller which consistently loads and ejects a disk without a considerable decrease in conveying force, even when the roller is employed in the presence of a very large amount of dust or over a very long period of time. The disk-loading roller is for loading a disk with the roller abutting a peripheral portion of the disk, and the roller has such an outer surface that the outer diameter of the roller varies in an axial direction and is formed from a rubber molded elastic product, wherein the roller has a rough outer surface having a peak count RPc of 2 to 30 per 700 μm, a maximum valley depth Rv of 35 to 80 μm, and an arithmetic mean roughness Ra of 2.5 to 5.5 μm, wherein these values are mean values as determined through measurement of the rough outer surface in a ×400 vision field.

3 Claims, 14 Drawing Sheets

Rv of the roller of Example 4 (JIS B 0601-2001)

Ra of the roller of Example 4 (JIS B 0601-2001)

Rq of the roller of Example 4 (JIS B 0601-2001)

DISK-LOADING ROLLER

The entire disclosure of Japanese Patent Applications Nos. 2006-039783 filed Feb. 16, 2006 and 2007-031796 filed Feb. 13, 2007 is expressly incorporated by reference herein.

BACKGROUND OF THE INVENTION

1. Field of the Invention

The present invention relates to a disk-loading roller for conveying a disk such as an optical disk or a magneto-optical disk (e.g., a CD, an LD, or a DVD) into a device such as an acoustic device, an information device, or an image-viewing device for operating the disk, and more particularly, to such a disk-loading roller which prevents loading or ejecting failure which would otherwise be caused by dust deposited on the disk; in particular, sand dust or similar dust, resulting in slipping of the roller.

2. Background Art

Conventionally, devices for operating an optical disk, a magneto-optical disk, or a like disk (e.g., a CD, an LD, or a DVD) employ a pair of loading rollers disposed opposite each other so as to hold the disk on a turntable in the devices. For example, as shown in FIG. 25, loading rollers 1 are disposed such that a shaft 2 penetrates each loading roller 1 at about the center axis thereof. A pair of the rollers are disposed opposite each other, and either of the rollers is rotatably driven. The diameter of each loading roller 1 is gradually decreased from the outer end to the center along the axis, and a disk 3 loaded to a device is supported only at a peripheral portion of the disk by the loading rollers 1 for centering.

When the disk 3 is inserted between such a pair of loading rollers 1 and either of the loading rollers is rotated, the disk 3 is conveyed into the device while being in contact with the two loading rollers 1. Then, when the head of the disk 3 abuts the wall of the disk-holder, transfer of the disk 3 and rotation of the loading rollers 1 are stopped, and only the shaft 2 is self-rotated. Thus, the disk 3 is held on the turntable.

Instead of employing a pair of loading rollers 1, as shown in FIG. 26, there may be employed another mechanism such that a disk 3 is inserted between a resin sheet material 4 and a single similar loading roller 1.

However, the aforementioned loading rollers have a drawback in that the rollers cannot provide sufficient torque for conveying a disk, because of dust deposited on a disk, in particular, sand dust or the like, which has been transferred to a roller surface and deposited on the roller surface in the course of long-term use.

As disclosed in Japanese Patent No. 3627866 (in Claims and other sections), the present inventor previously proposed a loading roller having a raised/dented outer surface provided during the molding process, the outer surface having a ten-point mean roughness Rz of 0.5 to 10 μm and a mean Sm of 15 μm or less.

The disk-loading roller exhibits excellent roller performance over a long period of time, in the case where a relatively small amount of dust is present. However, when the roller is employed in the presence of a large amount of dust, or over a very long period of time, further enhancement in currently attained performance is envisaged.

SUMMARY OF THE INVENTION

In view of the foregoing, an object of the present invention is to provide a disk-loading roller which consistently loads and ejects a disk without a considerable decrease in conveying force, even when the roller is employed in the presence of a very large amount of dust or for a very long period of time.

Accordingly, in a first mode of the present invention, there is provided a disk-loading roller for loading a disk with the roller abutting a peripheral portion of the disk, the roller having such an outer surface that the outer diameter of the roller varies in an axial direction and being formed from a rubber molded elastic product, wherein the roller has a rough outer surface having a peak count RPc of 2 to 30 per 700 μm, a maximum valley depth Rv of 35 to 80 μm, and an arithmetic mean roughness Ra of 2.5 to 5.5 μm, wherein these values are mean values as determined through measurement of the rough outer surface in a ×400 vision field.

A second mode of the present invention is directed to the disk-loading roller of the first mode, wherein the rough outer surface has a mean square root height Rq of 3.5 to 10.0 μm, as determined through measurement of the rough outer surface in a ×400 vision field.

A third mode of the present invention is directed to the disk-loading roller of the first or second mode, wherein the rubber molded elastic product has a rubber hardness, as stipulated by JIS A, of 20 to 90°.

The present invention can provide a disk-loading roller which consistently loads and ejects a disk without a considerable decrease in conveying force, even when the roller is employed in the presence of a very large amount of dust or over a very long period of time.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DETAILED DESCRIPTION OF PREFERRED EMBODIMENTS

The disk-loading roller of the present invention has a predetermined rough outer surface having large irregularities (peaks and valleys). By virtue of such a rough outer surface having large irregularities, even when the roller is employed in the presence of a very large amount of dust or a large amount of dust deposits accumulated over a very long period of time, such dust falls down into deep valleys. Therefore, there can be prevented impairment in conveying force which would otherwise be caused at the roller surface. In other words, since the disk-loading roller of the present invention has, on the surface thereof, deeper valleys which can accommodate dust, as compared with conventional rollers having a rough surface, conveying force does not decrease over a long period of time even when dust deposits on the surface of the roller.

The rough outer surface of the disk-loading roller of the present invention has a peak count RPc of 2 to 30 per 700 µm, a maximum valley depth Rv of 35 to 80 µm, and an arithmetic mean roughness Ra of 2.5 to 5.5 µm, wherein these values are mean values as determined through measurement of the rough outer surface in a ×400 vision field. These roughness parameters may be determined by means of, for example, a surface shape measurement microscope.

Figure 1:
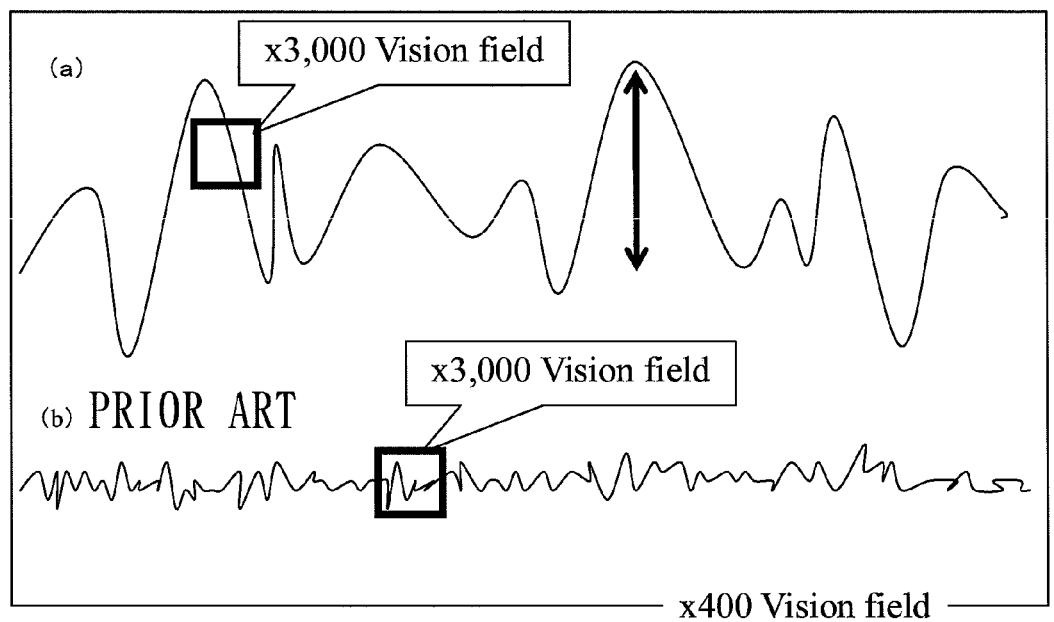
FIG. 1 is a schematic view of cross-section profiles of the disk-loading roller of the invention and a conventional disk-loading roller.

The reason why the magnification (×400) is employed for determining these values will next be described with reference to FIG. 1. FIG. 1 is a schematic view of cross-section profiles of the disk-loading roller of the invention and a conventional disk-loading roller as disclosed in Japanese Patent No. 3627866. In FIG. 1, curve (a) shows a cross-section profile of the disk-loading roller of the present invention, and curve (b) shows that of the conventional disk-loading roller. As shown by curve (b) in FIG. 1, the conventional disk-loading roller has relatively small roughness, and the general feature of the surface profile can be observed in a ×3,000 vision field. In contrast, as shown by curve (a) in FIG. 1, the disk-loading roller of the present invention has relatively large roughness, and only a portion of the surface profile is observable in a ×3,000 vision field. The disk-loading roller of the present invention cannot be characterized by numerical data which have been determined through measurement of the outer surface in a ×3,000 vision field and, therefore, completely differs from conventional disk-loading rollers characterized by various types of surface roughness values. Note that roughness of the surface of the disk-loading roller of the present invention is most suitably determined through observation in a ×400 vision field. If the surface is observed in a vision field at a magnification other than ×400, the measured values vary considerably.

Then, with reference to FIG. 2, the method for determining peak count (RPc) will be described. The peak count RPc is a parameter, which is employed for differentiating the disk-loading roller of the present invention from conventional disk-loading rollers, may be determined by means of a surface shape measurement microscope (e.g., an ultra-deep shape measurement apparatus, product of KEYENCE Corporation), and is defined as follows.

Figure 2:
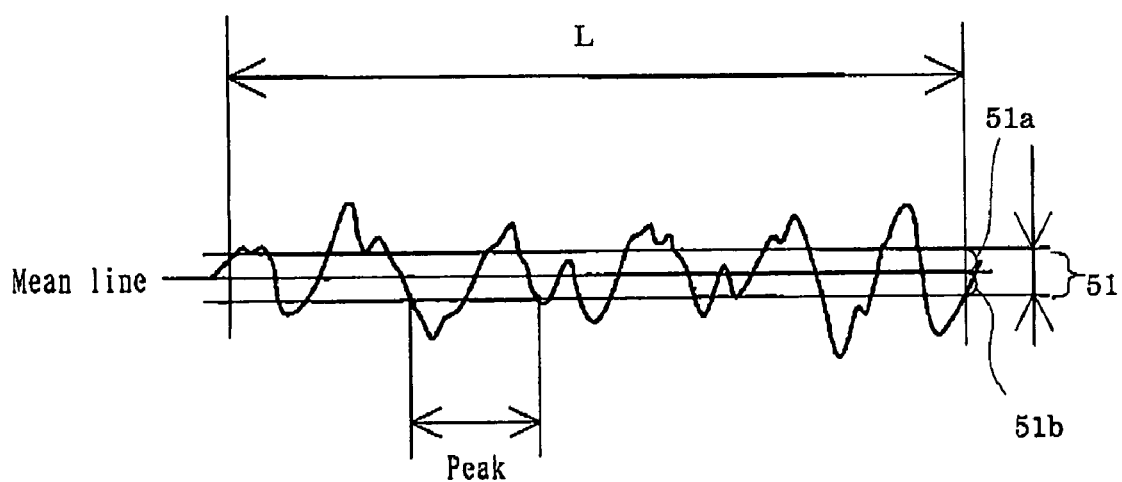
FIG. 2 is a chart showing a method for determining peak count RPc.

As shown in FIG. 2, dead zones 51a and 51b of the same width are provided on the upper and lower sides, respectively, of a mean line determined for the roughness curve. The dead zone width 51 is defined by the sum of the widths of dead zones 51a and 51b. As shown in FIG. 2, a roughness-related unit, herein named "peak," is defined by a segment of the roughness curve, which starts at a first point that crosses the lower line of the dead zone 51, extending downward then upward to cross the lower line and the upper line of the dead zone 51, and turning downward to cross the upper line, and ends at a second point on the lower line of the dead zone 51. Peaks are counted over a portion of the roughness curve corresponding to an evaluation length (L) along the mean line. The number of peaks counted within the evaluation length (L) is employed as peak count RPc. In the present invention, the RPc is a value determined in the case where an evaluation length (L) of 700 µm and a dead zone width of 5% are employed.

The rough outer surface of the disk-loading roller of the present invention has a peak count RPc of 2 to 30 per 700 µm, preferably 8 to 19, wherein the peak count is a mean value as determined through measurement of the rough outer surface in a ×400 vision field. Therefore, the disk-loading roller of the invention differs from the conventional disk-loading roller disclosed in Japanese Patent No. 3627866, which roller has a mean peak count RPc greater than 30. The disk-loading roller of the invention exhibits a peak count RPc smaller than that of conventional disk-loading rollers. That is, valleys and peaks have a wide width cut along the mean line. As used herein, the term "mean or mean value" refers to an average of measurements of a plurality of (e.g., ≧5) points on the rough surface. Hereinafter, the same definition is applied to other roughness parameters.

The disk-loading roller of the present invention has a rough outer surface having a maximum valley depth Rv of 35 to 80 µm, and an arithmetic mean roughness Ra of 2.5 to 5.5 µm, wherein these values are mean values. The maximum valley depth Rv and the arithmetic mean roughness Ra are determined in accordance with the methods of JIS B0601-2001.

The maximum valley depth Rv means a depth of the deepest valley observed in a portion of the roughness curve corresponding to an evaluation length (L) along the mean line. The term "valley" means a dented portion observed in a depth profile under the mean line. The disk-loading roller of the present invention has a mean maximum valley depth Rv of 35 to 80 µm, preferably 39 to 62 µm. When the mean maximum valley depth Rv is 35 µm or more, dented portions of the rough surface maintain a sufficient depth for receiving dust, whereas when the mean maximum valley depth Rv is 200 µm or less, heights or depths of irregularities do not exceed a suitable level, and cannot impair loading characteristics, and rollers having such a mean maximum valley depth Rv can be readily produced. However, when the mean maximum valley depth Rv is 80 µm or less, the produced disk-loading rollers satisfy more preferred conditions. Therefore, the upper limit is predetermined as 80 µm.

The mean value of the arithmetic mean roughness Ra is an average of heights of peaks and depths of valleys within a portion of the roughness curve corresponding to an evaluation length (L) along the mean line. The disk-loading roller of the present invention has a mean value of arithmetic mean roughness Ra of 2.5 to 5.5 µm, preferably 2.6 to 5.3 µm. When the mean value of arithmetic mean roughness Ra is 2.5 µm or more, the roller surface is a uniform surface having a surface roughness which satisfactorily receives dust, whereas when the mean value of arithmetic mean roughness Ra is more than 5.5 µm, loading characteristics are impaired, and such rollers are considerably difficult to produce.

When all the roughness parameters fall within the aforementioned ranges, the rough surface of a roller has dented portions which are larger and deeper as compared with those of a conventional rough surface of a disk-loading roller. That is, such large and deep dented portions sufficiently receive a large amount of dust. The disk-loading roller of the present invention has a rough surface which falls within the aforementioned parameter ranges. Therefore, even when a large amount of dust is deposited on the surface, the deposits fall into deep dented portions of the rough surface, whereby decrease in conveying force is prevented.

The disk-loading roller of the present invention preferably has an rough outer surface having a mean square root height Rq of 3.5 to 10.0 µm, more preferably 4.1 to 7.7 µm, as determined through measurement of the rough outer surface in a ×400 vision field. The square root height Rq is a square root of heights of peaks and depths of valleys within in a portion of the roughness curve corresponding to an evaluation length (L) along the mean line. When the mean square root height Rq falls within the range, the surface has a roughness sufficient for receiving dust. The square root height Rq is determined in accordance with the methods of JIS B0601-2001.

Furthermore, the rough surface preferably has a mean value of maximum height Rz of 85 to 220 µm, more preferably 100 to 150 µm. In the present invention, the maximum height Rz is determined, in accordance with JIS B0601-2001, through measurement of the rough outer surface in a ×400 vision field. The maximum height Rz is the sum of height of the highest peak and depth of the deepest valley as observed within a portion of the roughness curve corresponding to an evaluation length (L) along the mean line. When the maximum height Rz falls within the above range, a sufficient roughness of the roller surface is ensured.

Figure 3A:
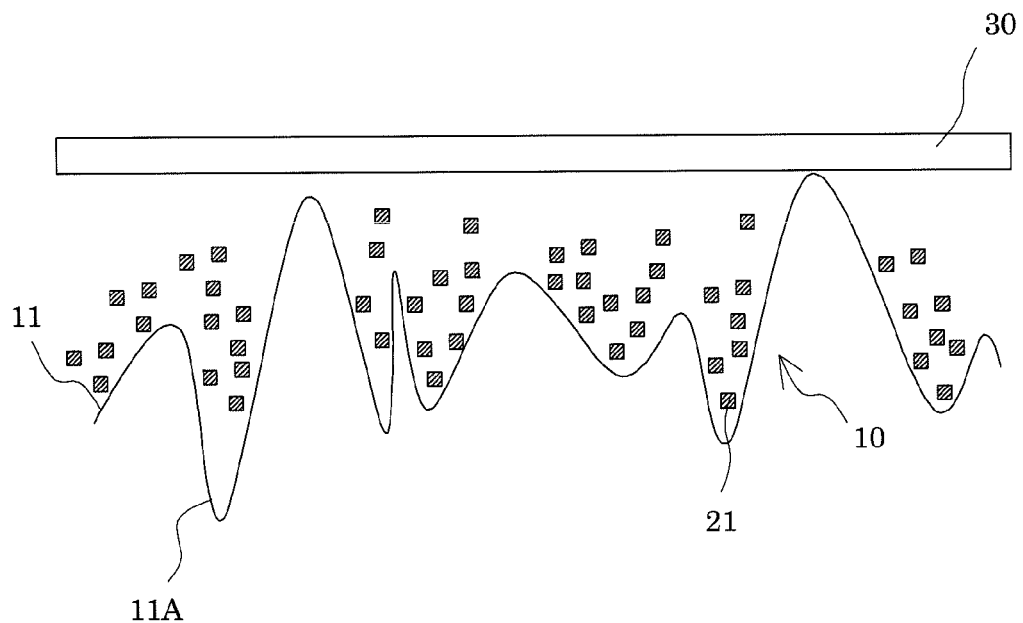
FIG. 3A schematically shows a disk conveyance feature when the disk-loading roller of the present invention is employed.
Figure 3B:
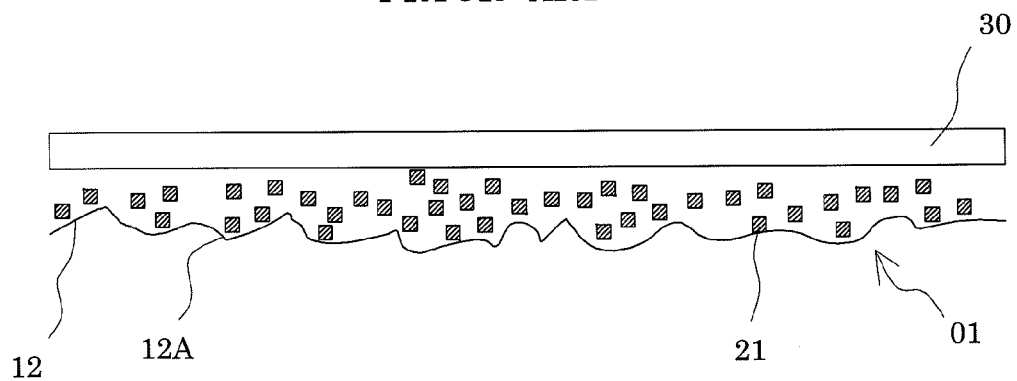
FIG. 3B schematically shows a disk conveyance feature when a conventional disk-loading roller is employed.
Figure 4:
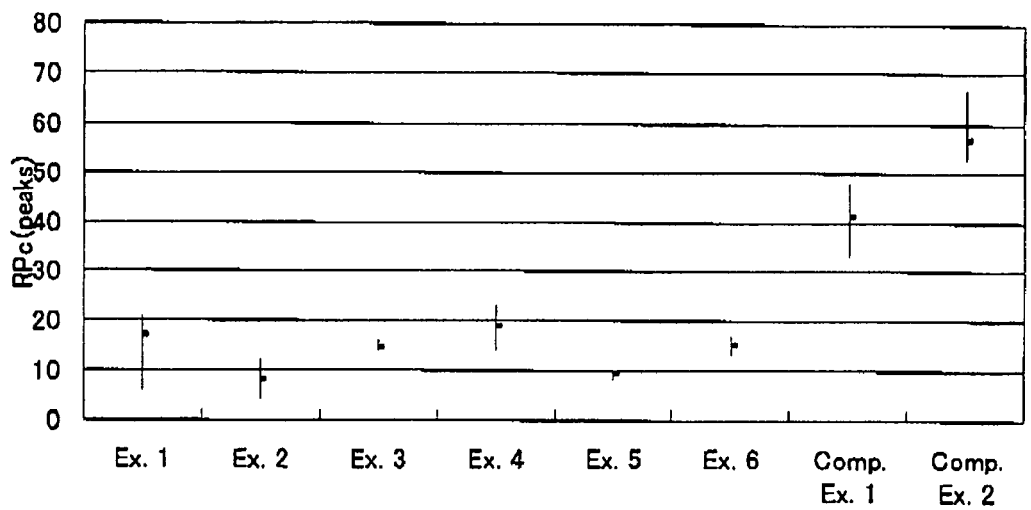
FIGS. 4 to 11 are graphs showing the results of Test Example 1.
Figure 5:
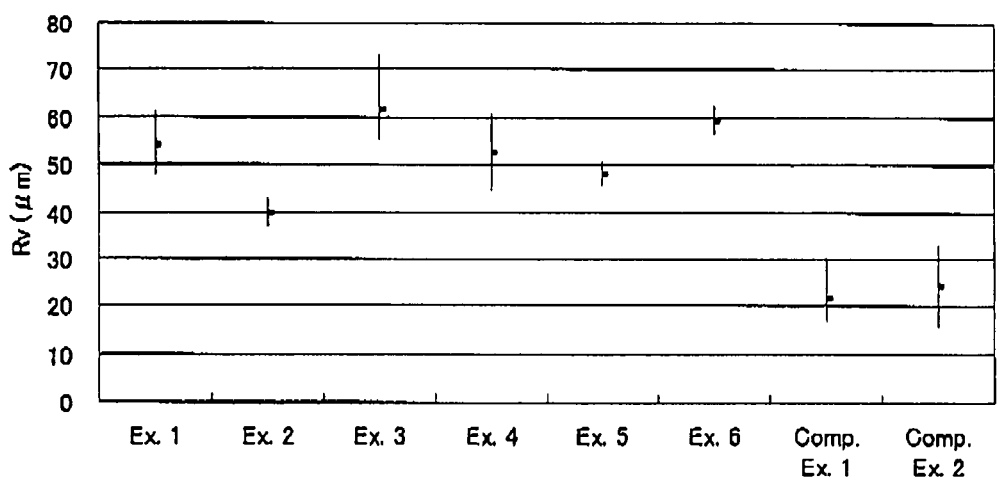
Figure 6:
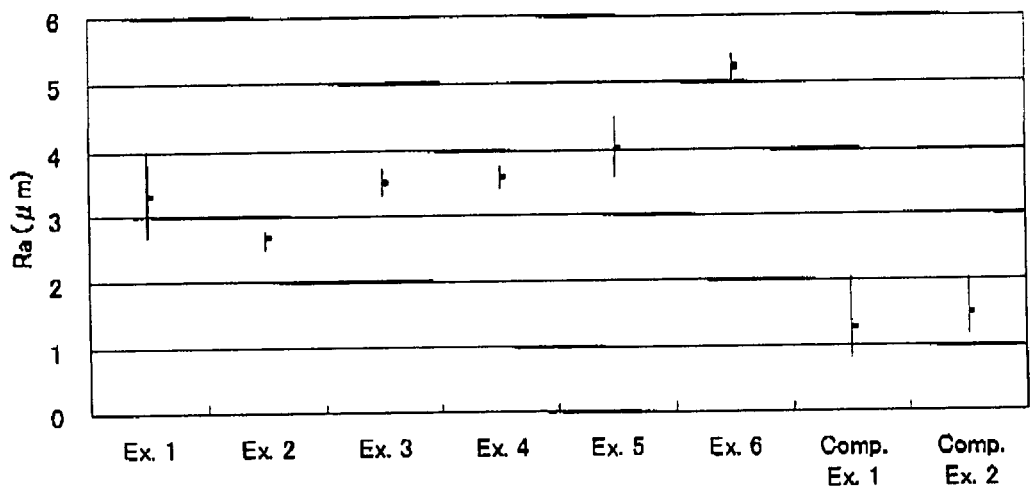
Figure 7:
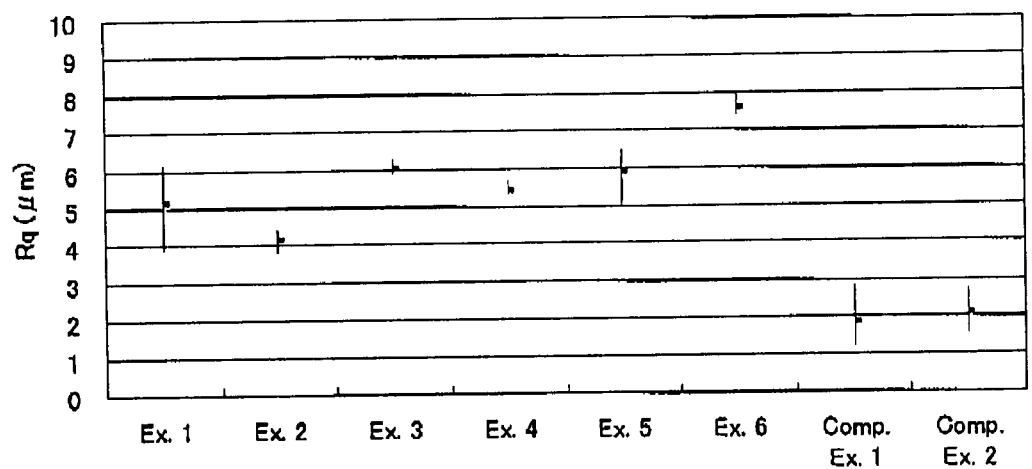
Figure 8:
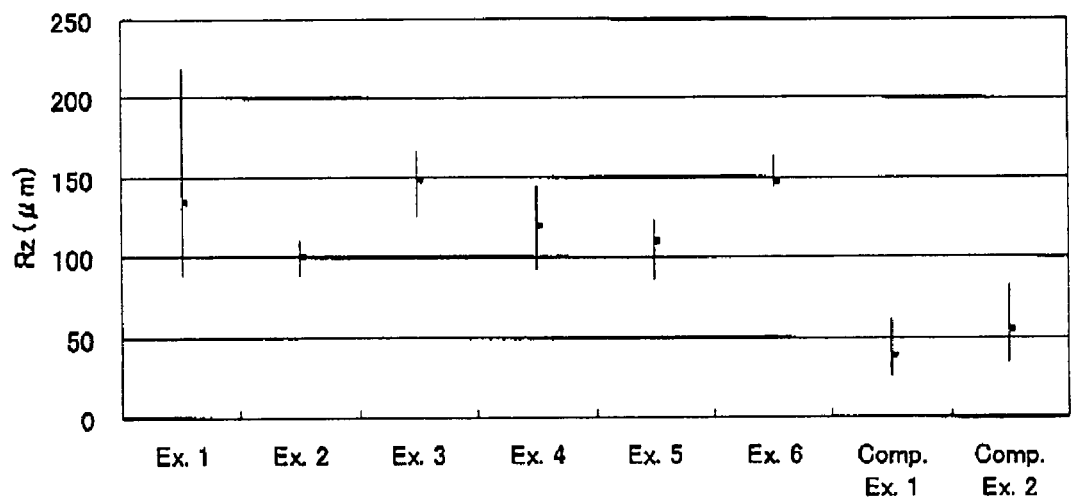
Figure 9:
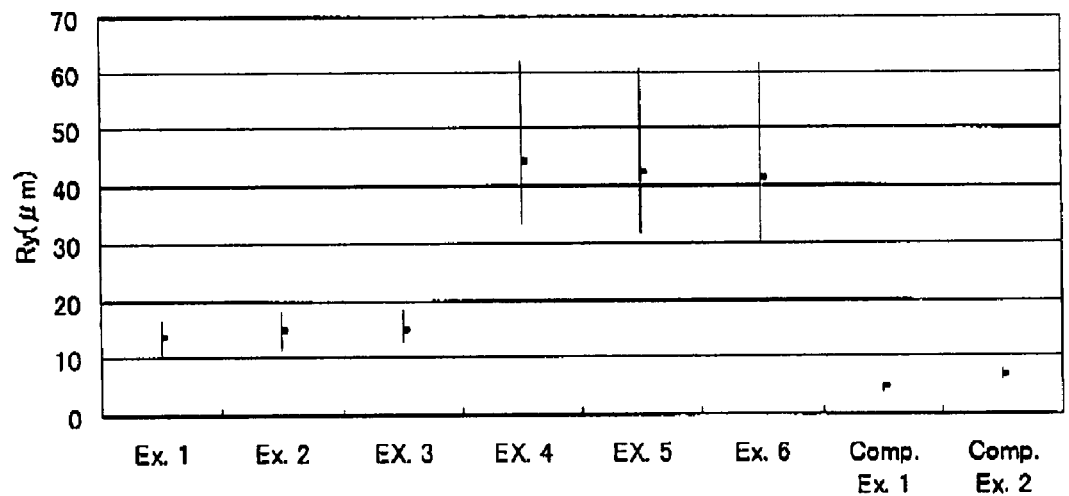
Figure 10:
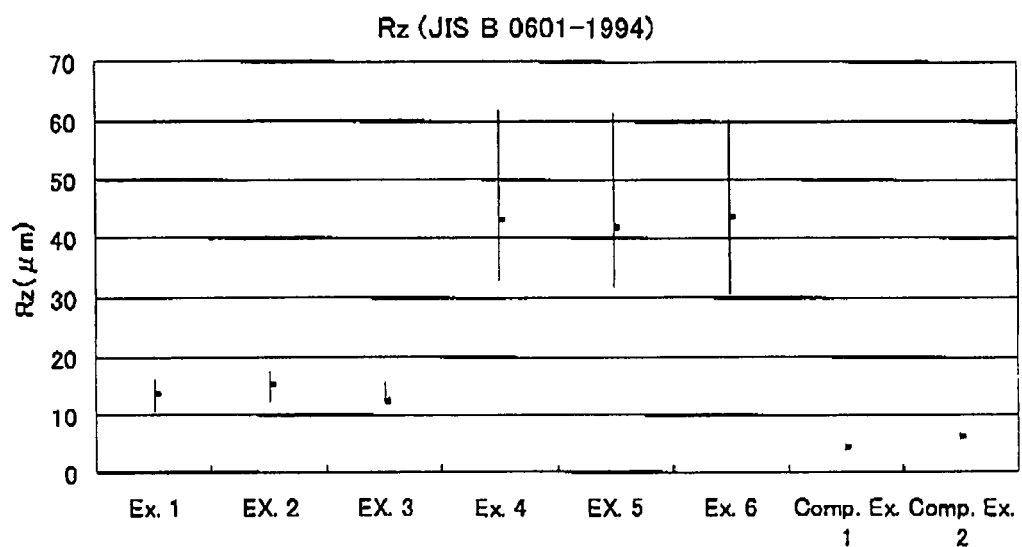
Figure 11:
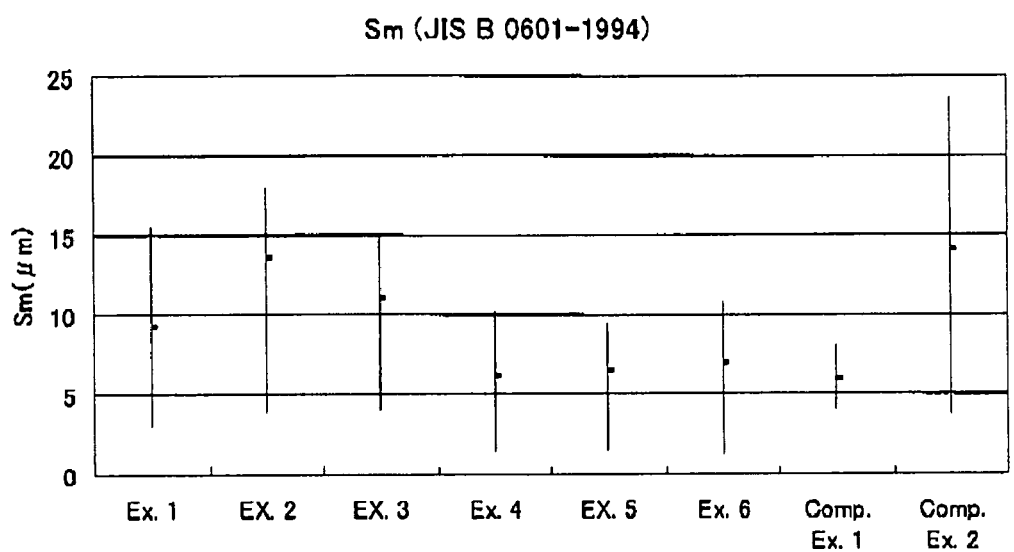
Figure 12:
FIG. 12 is a photograph showing the surface of the roller of Example 1 observed at a magnification of 400.
Figure 13:
FIG. 13 is a photograph showing the surface of the roller of Example 4 observed at a magnification of 400.
Figure 14:
FIG. 14 is a photograph showing the surface of the roller of Comparative Example 1 observed at a magnification of 400.
Figure 15:
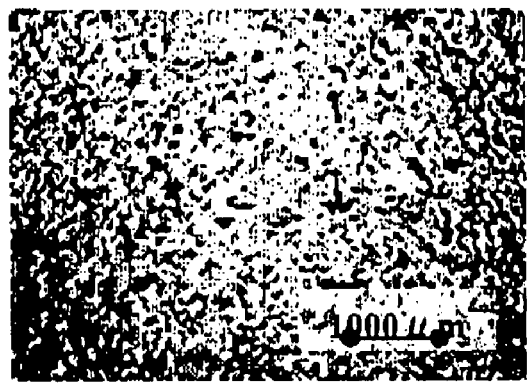
FIG. 15 is a photograph showing the surface of the roller of Comparative Example 2 observed at a magnification of 400.
Figure 16:
FIG. 16 is a photograph showing surfaces of the roller of Example 1 observed at a magnification of 3,000.
Figure 17:
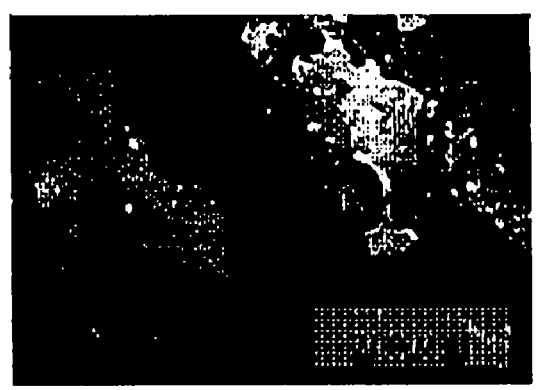
FIG. 17 is a photograph showing the surface of the roller of Example 4 observed at a magnification of 3,000.
Figure 18:
FIG. 18 is a photograph showing the surface of the roller of Comparative Example 1 observed at a magnification of 3,000.
Figure 19:
FIG. 19 is a photograph showing the surface of the roller of Comparative Example 2 observed at a magnification of 3,000.

With reference to FIGS. 3A and 3B, a disk conveyance feature, when the disk-loading roller of the present invention or a conventional disk-loading roller is employed, will next be described. FIG. 3A schematically shows a disk conveyance feature when the disk-loading roller 10 of the present invention is employed, and FIG. 3B schematically shows a disk conveyance feature when a conventional disk-loading roller 01 is employed. As shown in FIG. 3A, dust 21 deposited on the surface of the disk-loading roller 10 is transferred into dented portions 11A of a rough surface 11 during sliding of a disk 30 with respect to the roller. Therefore, the surface of the disk-loading roller 10 comes to be in direct contact with the disk 30, whereby sufficient conveying force is maintained. Such a feature is similar to the case as shown in FIG. 3B. Specifically, dust 21 deposited on the surface of the disk-loading roller 01 is transferred into dented portions 12A of a rough surface 12 during sliding of a disk 30 with respect to the roller. Therefore, the surface of the disk-loading roller 01 comes to be in direct contact with the disk 30, whereby sufficient conveying force is maintained. However, when a large amount of dust 21 is present between the disk-loading roller 01 as shown in FIG. 3B and the disk, the dented portions 12A cannot completely receive the dust 21. In such a case, contact between the disk-loading roller 01 and the disk 30 is impeded, thereby failing to attain sufficient conveying force, resulting in loading failure. In contrast, since the disk-loading roller 10 of the present invention as shown in FIG. 3A has a surface 11 having large roughness, a large amount of dust 21 is received in the dented portions 11A. As a result, contact between the disk-loading roller 10 and the disk 30 is not impeded, thereby ensuring sufficient conveying force.

The disk-loading roller of the present invention may be produced through molding EPDM, silicone, chloroprene, NBR, or a similar material.

The disk-loading roller of the present invention generally has a rubber hardness, as stipulated by JIS A, of 20 to 90°, particularly preferably 30 to 60°, since such rubber hardness ensures sufficient conveying force.

The disk-loading roller of the present invention has predetermined roughness on the entire outer surface. No particular limitation is imposed on the method for providing roughness to the outer surface, and such roughness may be provided after formation of a rubber roller body through molding, or simultaneously with molding.

In the case where roughness is provided during the molding process, no particular limitation is imposed on the method for forming an irregularity (roughness) pattern on the inner surface of the mold cavity. The pattern may be provided in a simple manner at low cost through chemical treatment such as corrosion treatment or through a mechanical process such as sandblasting or shot-blasting.

EXAMPLES

The present invention will next be described in detail by way of examples, which should not be construed as limiting the invention thereto.

Example 1

Silicone rubber was press-molded (for primary vulcanization) at 170° C. for eight minutes by means of an electroheating pressing apparatus employing a mold having a predetermined pattern formed through corrosion treatment, to thereby produce a cylinder having a rubber hardness of 30° (JIS A) and a rough outer surface. The rough surface was found to have a peak count RPc of 2 to 30, a maximum valley depth Rv of 35 to 80 µm, and an arithmetic mean roughness Ra of 2.5 to 5.5 µm, wherein these values are mean values as determined through measurement of the rough outer surface in a ×400 vision field. Through cutting the cylinder by means of a cut-off tool, disk-loading rollers of Example 1 were produced.

Example 2

A mold was produced under the same conditions as employed in Example 1, and by use of the mold disk-loading rollers of Example 2 were produced under the same conditions as employed in Example 1.

Example 3

A mold was produced under the same conditions as employed in Example 1, and by use of the mold disk-loading rollers of Example 3 were produced under the same conditions as employed in Example 1.

Example 4

Silicone rubber was press-molded (for primary vulcanization) at 170° C. for eight minutes by means of an electroheating pressing apparatus employing a mold different from the mold employed in Example 1, to thereby produce a cylinder having a rubber hardness of 30° (JIS A) and a rough outer surface. The rough surface was found to have a peak count RPc of 2 to 30, a maximum valley depth Rv of 35 to 80 µm, and an arithmetic mean roughness Ra of 3.0 to 4.0 µm, wherein these values are mean values as determined through measurement of the rough outer surface in a ×400 vision field.

Through cutting the cylinder by means of a cut-off tool, disk-loading rollers of Example 4 were produced.

Example 5

A mold was produced under the same conditions as employed in Example 4, and by use of the mold disk-loading rollers of Example 5 were produced under the same conditions as employed in Example 4.

Example 6

A mold was produced under the same conditions as employed in Example 4, and by use of the mold disk-loading rollers of Example 6 were produced under the same conditions as employed in Example 4.

Comparative Example 1

The procedure of Example 1 was repeated, except that a mold different from the mold employed in Example 1 was used, to thereby produce disk-loading rollers of Comparative Example 1. In Comparative Example 1, the outer surface of a cylinder had a mean value of ten-point mean roughness Rz of 0.5 to 10 μm and a mean value of mean spacing of irregularities Sm of 15 μm or less. Note that the disk-loading roller of Comparative Example 1 is the same roller as disclosed in Japanese Patent No. 3627866.

Comparative Example 2

The same silicone rubber as employed in Example 1 was molded by use of a mold having a quasi-mirror surface, to thereby produce disk-loading rollers. Note that the disk-loading roller of Comparative Example 2 is the same roller as disclosed in Comparative Example described in Japanese Patent No. 3627866.

Test Example 1

Surface roughness of each of the disk-loading rollers of the Examples and the Comparative Examples was determined by use of surface roughness parameters. Specifically, peak count RPc was determined under measurement conditions 1; maximum valley depth Rv and arithmetic mean roughness Ra, square root height Rq, and maximum height Rz were determined under measurement conditions 2; and maximum height Ry, ten-point mean roughness Rz, and mean spacing of irregularities Sm were determined under measurement conditions 3. A mean value of each roughness parameter of each roller was determined. The mean value was obtained through measurement at five points selected at random from the large-diameter end to the 30 mm length of each of the disk-loading rollers of the Examples and Comparative Examples.

Measurement conditions 3, which are employed in Japanese Patent No. 3627866 for determining surface roughness of disk-loading rollers, were employed in Test Example 1 in order to confirm how the roughness parameters of the disk-loading roller of the present invention were affected varied under measurement conditions 3. As mentioned above, only a portion of the surface profile is observable in a ×3,000 vision field, and therefore, the values determined under conditions 3 do not necessarily reflect the roughness accurately.

The employed measurement apparatus was an ultra-deep shape measurement apparatus (product of KEYENCE corporation, controller unit "VK-9500," measurement unit "VK-9510," and surface roughness measurement application "VK-H1R9 (JIS B 0601-2001) and VK-H1A9 (JIS B 0601-1994)). The results are shown in Tables 1 and 2 and FIGS. 4 to 11.

FIGS. 12 to 19 show the surfaces of the rollers of Example 1, Example 4, Comparative Example 1 and Comparative Example 2 as observed in ×400 and ×3,000 vision fields.

<Measurement Conditions 1>

Magnification: ×400

Pitch; 0.5 μm

Cut-off: λS 2.5 μm, λc 0.08 mm

Optical zoom; ×1.0

Evaluation length: 700 μm

Dead zone: 5%

Smoothing: ±2

<Measurement Conditions 2>

Area-mean roughness: JIS B 0601-2001

Magnification: ×400

Pitch: 0.5 μm

Cut-off: λS 2.5 μm, λc 0.08 mm

Optical zoom: ×1.0

Area-mean roughness evaluation area: 500 μm×700 μm

Smoothing: none

<Measurement Conditions 3>

Area-mean/profile roughness: JIS B 0601-1994

Magnification: ×3,000

Pitch: 0.5 μm

Cut-off: λS 2.5 μm, λc 0.08 mm

Optical zoom: ×1.0

Area-mean roughness evaluation area: 500 μm×700 μm

Profile roughness evaluation length: 50 μm

Smoothing: ±2

TABLE 1

| | | | Ex. 1 | Ex. 2 | Ex. 3 | Ex. 4 | Ex. 5 | Ex. 6 |
|---|---|---|---|---|---|---|---|---|
| ×400 | RPc | MIN | 6 | 4 | 14 | 14 | 8 | 13 |
| (JIS B | (peaks) | MAX | 21 | 12 | 16 | 23 | 10 | 17 |
| 0601- | | AVE | 17 | 8 | 15 | 19 | 10 | 15 |
| 2001) | Rv | MIN | 47.77 | 36.86 | 54.96 | 44.37 | 45.35 | 56.66 |
| | (μm) | MAX | 60.98 | 42.99 | 73.10 | 60.84 | 50.70 | 62.53 |
| | | AVE | 54.21 | 39.98 | 61.25 | 52.62 | 48.05 | 59.21 |
| | Ra | MIN | 2.67 | 2.50 | 3.30 | 3.41 | 3.56 | 5.01 |
| | (μm) | MAX | 4.01 | 2.78 | 3.71 | 3.76 | 4.51 | 5.44 |
| | | AVE | 3.31 | 2.69 | 3.51 | 3.59 | 4.03 | 5.24 |

TABLE 1-continued

|  |  |  | Ex. 1 | Ex. 2 | Ex. 3 | Ex. 4 | Ex. 5 | Ex. 6 |
|---|---|---|---|---|---|---|---|---|
|  | Rq | MIN | 3.91 | 3.81 | 5.90 | 5.28 | 5.04 | 7.42 |
|  | (μm) | MAX | 6.15 | 4.40 | 6.28 | 5.71 | 6.48 | 7.94 |
|  |  | AVE | 5.13 | 4.15 | 6.04 | 5.45 | 5.94 | 7.61 |
|  | Rz | MIN | 87.7 | 87.9 | 125.5 | 91.6 | 85.5 | 143.3 |
|  | (μm) | MAX | 218.6 | 110.3 | 166.8 | 144.4 | 123.2 | 163.5 |
|  |  | AVE | 134.1 | 100.3 | 148.6 | 119.9 | 110.5 | 147.3 |
| ×3,000 | Ry | MIN | 10.60 | 11.40 | 12.43 | 33.23 | 31.55 | 30.12 |
| (JIS B | (μm) | MAX | 16.39 | 17.84 | 18.54 | 62.09 | 60.45 | 61.65 |
| 0601- |  | AVE | 13.75 | 14.65 | 14.78 | 44.48 | 42.43 | 41.23 |
| 1994) | Rz | MIN | 10.60 | 12.04 | 12.76 | 33.09 | 31.65 | 30.34 |
|  | (μm) | MAX | 16.33 | 17.44 | 15.65 | 62.05 | 61.44 | 60.45 |
|  |  | AVE | 13.67 | 15.34 | 12.43 | 43.28 | 42.11 | 44.01 |
|  | Sm | MIN | 2.93 | 3.91 | 4.02 | 1.37 | 1.47 | 1.30 |
|  | (μm) | MAX | 15.53 | 17.91 | 14.98 | 10.21 | 9.42 | 10.65 |
|  |  | AVE | 9.26 | 13.60 | 11.07 | 6.10 | 6.50 | 6.90 |

TABLE 2

|  |  |  | Comp. Ex. 1 | Comp. Ex. 2 |
|---|---|---|---|---|
| ×400 | RPc | MIN | 33 | 53 |
| (JIS B | (peaks) | MAX | 48 | 67 |
| 0601- |  | AVE | 41 | 57 |
| 2001) | Rv | MIN | 16.57 | 15.56 |
|  | (μm) | MAX | 30.22 | 33.12 |
|  |  | AVE | 21.43 | 24.31 |
|  | Ra | MIN | 0.80 | 1.15 |
|  | (μm) | MAX | 2.07 | 2.03 |
|  |  | AVE | 1.26 | 1.50 |
|  | Rq | MIN | 1.19 | 1.50 |
|  | (μm) | MAX | 2.84 | 2.76 |
|  |  | AVE | 1.85 | 2.10 |
|  | Rz | MIN | 25.37 | 33.94 |
|  | (μm) | MAX | 61.83 | 82.54 |
|  |  | AVE | 38.78 | 53.91 |
| ×3,000 | Ry | MIN | 3.78 | 5.62 |
| (JIS B | (μm) | MAX | 5.45 | 7.81 |
| 0601- |  | AVE | 4.61 | 6.59 |
| 1994) | Rz | MIN | 3.75 | 5.60 |
|  | (μm) | MAX | 5.04 | 6.94 |
|  |  | AVE | 4.45 | 6.14 |
|  | Sm | MIN | 4.00 | 3.72 |
|  | (μm) | MAX | 8.09 | 23.73 |
|  |  | AVE | 5.88 | 14.10 |

When the surfaces of the disk-loading rollers of the Examples were analyzed in a ×400 vision field, each roller was found to have an outer surface having a peak count RPc of 2 to 30 per 700 μm, a maximum valley depth Rv of 35 to 80 μm, and an arithmetic mean roughness Ra of 2.5 to 5.5 μm, wherein these values were mean values. In contrast, the disk-loading rollers of Comparative Examples 1 and 2 were found to have values of these surface parameters falling outside the above ranges. Thus, the disk-loading roller of the present invention was confirmed to be completely different from conventional disk-loading rollers.

The disk-loading rollers of the Examples were found to have a mean value of square root height Rq of 3.5 to 10.0 μm and a mean value of maximum height Rz of 85 to 220 μm.

Under measurement conditions 3 (in a ×3,000 vision field), which are the same as conventional measurement conditions, the disk-loading rollers of Comparative Examples 1 and 2 were found to have a mean value of ten-point mean roughness Rz of 0.5 to 10 μm and a mean value of mean spacing of irregularities Sm of 15 μm or less. For comparison, the disk-loading rollers of the Examples, which are not preferred for analysis in a ×3,000 vision field as mentioned above, were analyzed under conditions 3. Through the measurement, all the disk-loading rollers of the Examples were found to exhibit a mean value of mean spacing of irregularities Sm of 15 μm or less, but a mean value of ten-point mean roughness Rz of more than 10 μm.

Photographs showing surfaces of the rollers of Examples 1 and 4 (FIGS. 12 and 16 and FIGS. 13 and 17) were compared with those of the rollers of Comparative Examples 1 and 2 (FIGS. 14 and 18 and FIGS. 15 and 19). As is clear from the photographs, the rollers of Examples 1 and 4 were found to have surfaces clearly different from those of the rollers of Comparative Examples 1 and 2. In other words, each the rollers of the Examples had a surface roughness considerably larger than that of the rollers of the Comparative Examples.

Test Example 2

The outer surface of the disk-loading rollers of Example 4 was observed under the same conditions as conditions 2 employed in Test Example 1, but in ×200 and ×1,000 vision fields. Maximum valley depth Rv, arithmetic mean roughness Ra, and square root height Rq were determined. Table 3 and FIGS. 20 to 22 show the results.

TABLE 3

|  |  |  | ×200 | ×400 | ×1,000 |
|---|---|---|---|---|---|
| Ex. 4 | Rv | MIN | 75.85 | 44.37 | 22.59 |
| (JIS B | (μm) | MAX | 169.65 | 60.84 | 50.27 |
| 0601- |  | AVE | 125.58 | 52.62 | 38.11 |
| 2001) | Ra | MIN | 3.99 | 3.41 | 3.46 |
|  | (μm) | MAX | 5.60 | 3.76 | 5.76 |
|  |  | AVE | 5.00 | 3.59 | 4.41 |
|  | Rq | MIN | 5.84 | 5.28 | 4.93 |
|  | (μm) | MAX | 9.22 | 5.71 | 9.47 |
|  |  | AVE | 8.00 | 5.45 | 6.73 |

Figure 20:
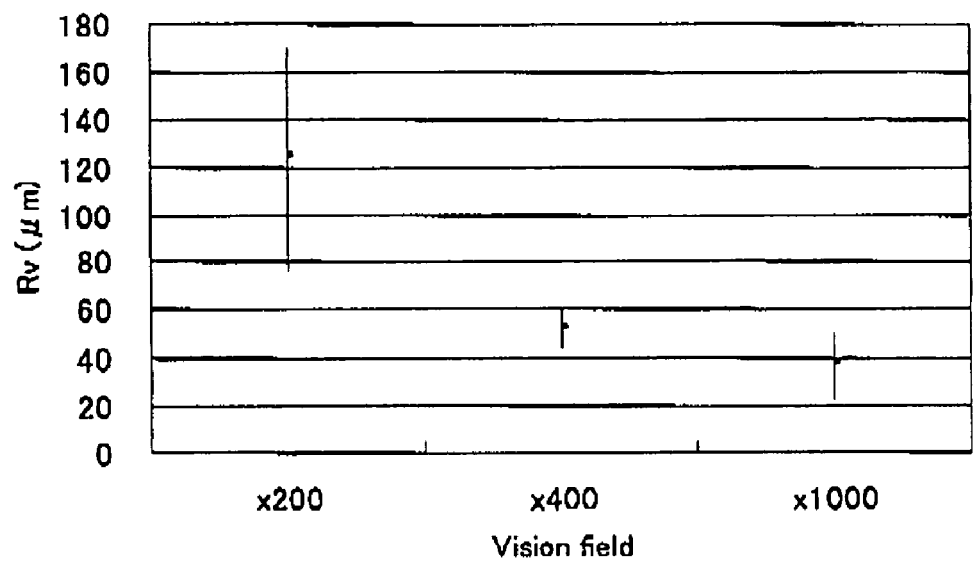
FIG. 20 is a graph showing maximum valley depth Rv of the roller of Example 4 at respective magnifications.
Figure 21:
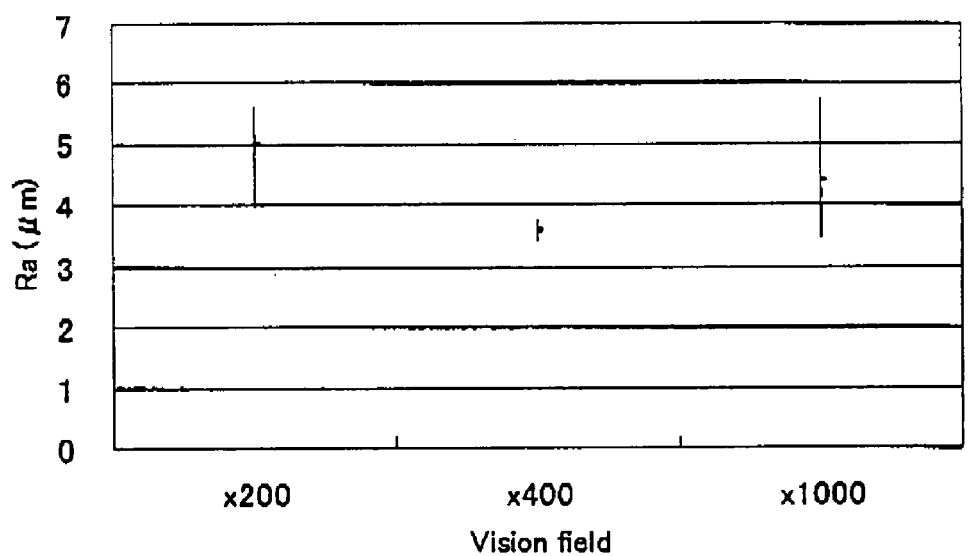
FIG. 21 is a graph showing arithmetic mean roughness Ra of the roller of Example 4 at respective magnifications.
Figure 22:
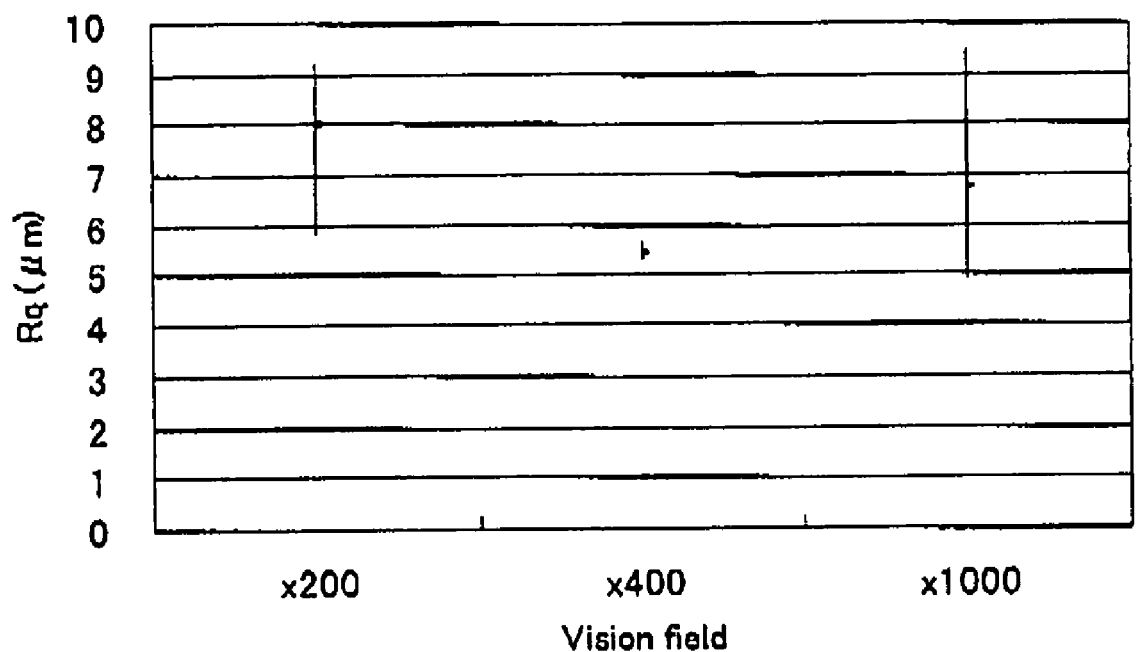
FIG. 22 is a graph showing square root height Rq of the roller of Example 4 at respective magnifications.

As is clear from FIGS. 20 to 22, difference between the maximum value and the minimum value was smallest in terms of maximum valley depth Rv, arithmetic mean roughness Ra, and square root height Rq of the disk-loading roller of Example 4, when the outer surface of the roller was analyzed in a ×400 vision field. Thus, determination of surface roughness parameters of the disk-loading roller of the present invention was found to be most suitably performed through observation in a ×400 vision field.

In contrast, when the outer surface was analyzed in a ×200 or ×1,000 vision field, deviation of these parameters was considerably large. Thus, observation of the surface in a ×200 or ×1,000 vision field was found to be not suited for the determination of surface roughness parameters of the disk-loading roller of the present invention.

Test Example 3

Loading performance (conveying force) of disk-loading rollers of the Examples and Comparative Examples was determined by means of an apparatus employing a disk-loading roller and a counter member. Firstly, a disk was bound to a cord and pulled through each disk-loading roller and a counter member. When the center of the disk reached the position under the roller, conveying force was measured by means of a dial tension gage (run 0).

Figure 23:
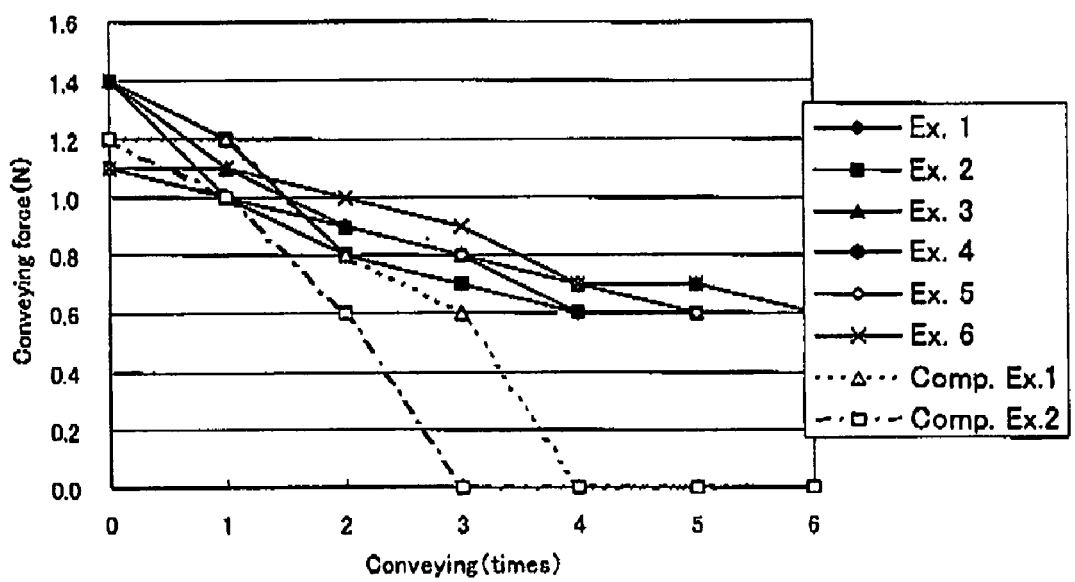
FIGS. 23 and 24 are graphs showing the results of Test Example 3.

Then, the disk was removed from the roller and the counter member, and the roller was placed in a test tank where the following dust spray test was performed. Specifically, dust (JIS class 8) was sprayed to the roller for one minute by means of a fan while the tank was tightly closed. One minute after stopping of the fan, the disk-loading roller was removed from the test tank. The roller was rotated 90° so that the dust was uniformly deposited on the entire roller surface. Then, the roller was placed again in the test tank, and subjected to dust spraying for one minute and allowed to stand for one minute. Herein, four rotation steps; i.e., rotation of 360° (90°×4), are defined as one cycle. After subjecting the roller to one cycle, conveying force was determined again through the above method. The amount of dust sprayed in one rotation (90°) was 1 g; i.e., 4 g of dust was sprayed in one cycle. The procedure was repeated several times. Table 4 and FIG. 23 show the results.

Dust Spray Test Conditions
  Type of dust; JIS Z8901 class 8
  Amount of dust sprayed: 4.0 g/CyC
  Test temp.: 20±15° C.
  Relative humidity: 45 to 85%
  Test tank capacity: 27,000 cm$^3$
  Agitation time: 1 min×4
  Halt time: 1 min×4
  Note that JIS Z8901 class 8 dust is Kanto loam dust having a medium particle size of 6.6 to 8.6 μm.

TABLE 4

| Conveyance | | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|---|
| Conveying force (N) | Run 0 | 1.4 | 1.4 | 1.4 | 1.1 | 1.1 | 1.1 | 1.2 | 1.2 |
| | Run 1 | 1.0 | 1.2 | 1.1 | 1.0 | 1.0 | 1.1 | 1.2 | 1 |
| | Run 2 | 0.8 | 0.8 | 0.9 | 0.9 | 0.8 | 1.0 | 0.8 | 0.6 |
| | Run 3 | 0.8 | 0.7 | 0.8 | 0.8 | 0.8 | 0.9 | 0.6 | — |
| | Run 4 | 0.8 | 0.6 | 0.7 | 0.7 | 0.7 | 0.7 | — | — |
| | Run 5 | 0.6 | 0.6 | 0.6 | 0.7 | 0.6 | 0.7 | — | — |
| | Run 6 | 0.6 | 0.6 | 0.6 | 0.6 | 0.6 | 0.6 | — | — |

—: Failure to load, not measurable

From the values of conveying force determined in Test Example 3, percent decrease in conveying force of the disk-loading rollers of the Examples and Comparative Examples was derived on the basis of the following equation:

Percent decrease in conveying force (%) = $100 \times (t_n - t_0)/t_0$, wherein $t_0$ represents conveying force (N) before dust deposition, and $t_n$ represents conveying force (N) after n cycles.

Figure 24:
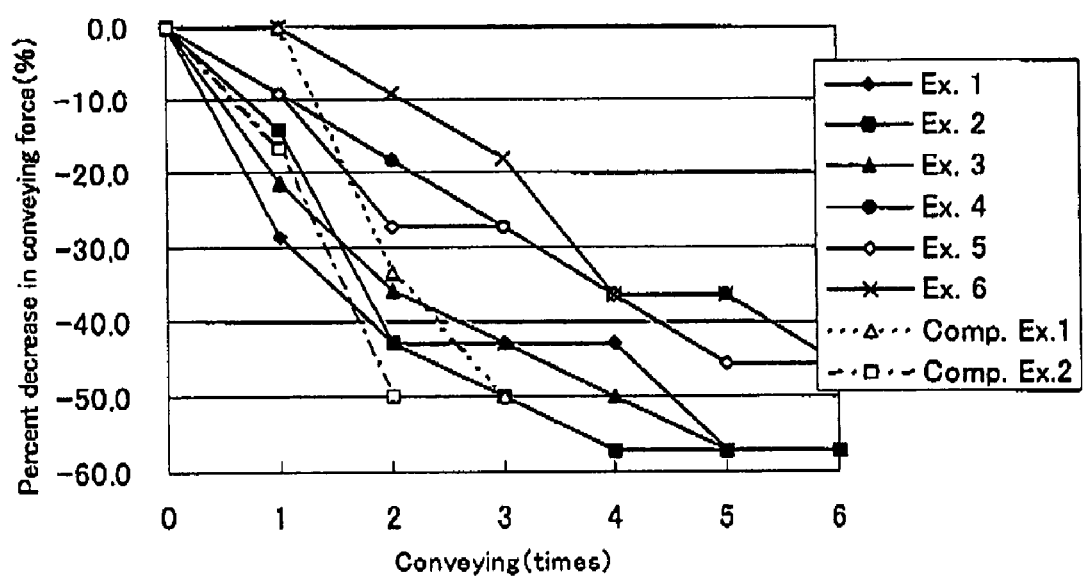
Figure 25:
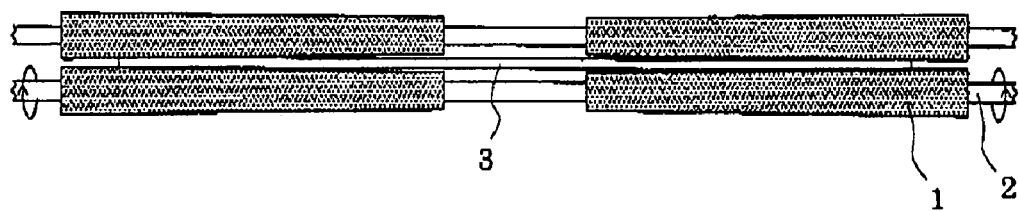
FIGS. 25 and 26 are sketches showing a mode of employing a disk-loading roller.
Figure 26:
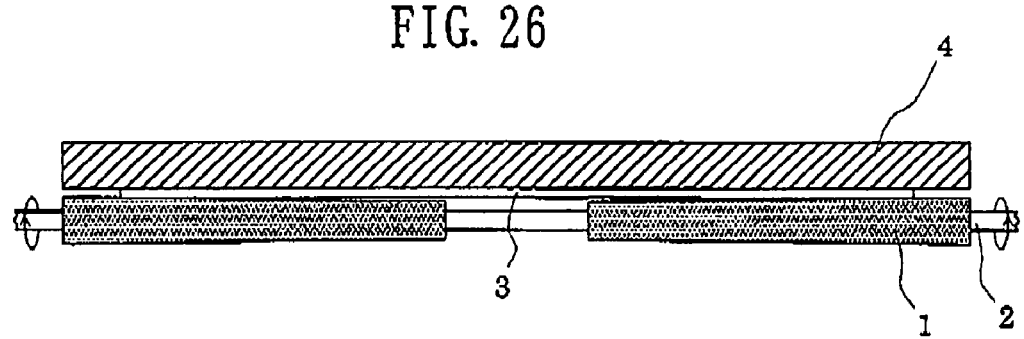

The results are shown in Table 5 and FIG. 24.

TABLE 5

| Conveyance | | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|---|
| Percent decrease in conveying force (%) | Run 0 | 0 | 0 | 0 | 0 | 0 | 0 | 0 | 0 |
| | Run 1 | −28.6 | −14.3 | −21.4 | −9.1 | −9.1 | 0 | 0 | −16.7 |
| | Run 2 | −42.9 | −42.9 | −35.7 | −18.2 | −27.3 | −9.1 | −33.3 | −50.0 |
| | Run 3 | −42.9 | −50.0 | −42.9 | −27.3 | −27.3 | −18.2 | −50.0 | — |
| | Run 4 | −42.9 | −57.1 | −50.0 | −36.4 | −36.4 | −36.4 | — | — |
| | Run 5 | −57.1 | −57.1 | −57.1 | −36.4 | −45.5 | −36.4 | — | — |
| | Run 6 | −57.1 | −57.1 | −57.1 | −45.5 | −45.5 | −45.5 | — | — |

The disk-loading roller of Comparative Example 1 failed to load a disk after 4 cycles of dust spraying (Kanto loam dust, JIS Z8901 class 8), and the disk-loading roller of Comparative Example 2 exhibited disk loading failure after 3 cycles. In contrast, all the disk-loading rollers of the Examples ensured disk loading even after 4 cycles of dust spraying. Although the data are not given in Table 4, the disk-loading rollers of Examples 4 to 6 maintained sufficient conveying force after 7 cycles.

In terms of percent decrease in conveying force, the disk-loading rollers of the Examples were found to exhibit small percent decrease in conveying force after 2 cycles of dust spraying. In contrast, the disk-loading rollers of the Comparative Examples 1 and 2 exhibited considerable drop in conveying force after 2 cycles.

The tests reveals that the disk-loading roller of the present invention exhibits no considerable decrease in conveying force, even after the roller has been employed under the conditions where a large amount of dust is deposited on the surface of the roller.

What is claimed is:

1. A disk-loading roller for loading a disk with the roller abutting a peripheral portion of the disk, the roller having such an outer surface that the outer diameter of the roller varies in an axial direction and being formed from a rubber molded elastic product, wherein
    the roller has a rough outer surface having
    a peak count RPc of 2 to 30 per 700 μm,
    a maximum valley depth Rv of 35 to 80 μm, and
    an arithmetic mean roughness Ra of 2.5 to 5.5 μm,
    wherein these values are mean values as determined through measurement of the rough outer surface in a ×400 vision field.

2. A disk-loading roller as described in claim 1, wherein the rough outer surface has a mean square root height Rq of 3.5 to 10.0 μm, as determined through measurement of the rough outer surface in a ×400 vision field.

3. A disk-loading roller as described in claim 1, wherein the rubber molded elastic product has a rubber hardness, as stipulated by JIS A, of 20 to 90°.

* * * * *